US006185984B1

United States Patent
Takahashi

(10) Patent No.: US 6,185,984 B1
(45) Date of Patent: Feb. 13, 2001

(54) DEVICE FOR DETECTING THE KNOCKING OF AN INTERNAL COMBUSTION ENGINE

(75) Inventor: Yasuhiro Takahashi, Tokyo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/495,484

(22) Filed: Feb. 1, 2000

(30) Foreign Application Priority Data

Sep. 16, 1999 (JP) .................................................. 11-261627

(51) Int. Cl.$^7$ .................................................. G01L 23/22
(52) U.S. Cl. .................................................. 73/35.08
(58) Field of Search .................................. 73/35.01, 35.07, 73/35.08, 116, 117.2; 324/378

(56) References Cited

U.S. PATENT DOCUMENTS

| 4,565,087 | * | 1/1986 | Damson et al. | 73/35.08 |
| 5,483,818 | * | 1/1996 | Brandt et al. | 73/35.01 |
| 5,561,239 | * | 10/1996 | Yasuda | 73/35.08 |
| 5,694,900 | | 12/1997 | Morita et al. | 123/425 |
| 5,959,192 | * | 9/1999 | Mogi et al. | 73/35.08 |
| 6,011,397 | * | 1/2000 | Yasuda | 324/388 |
| 6,118,276 | * | 9/2000 | Nakata et al. | 324/464 |

* cited by examiner

Primary Examiner—Richard A. Moller
(74) Attorney, Agent, or Firm—Sughrue, Mion, Zinn, Macpeak & Seas, PLLC

(57) ABSTRACT

A device for detecting the knocking of an internal combustion engine maintaining a favorable knock-detecting state even when a noise component having a small amplitude and lasting long is superposed on an ionic current detection signal. The device comprises a means 1 for detecting the ionic current i that flows through a spark plug 8, a filter 2 means for picking up knock signals Ki from the ionic current, a means 22 for judging the knocking state based on the knock signals, a means 11 for operating a first integrated value Km1 of the knock signals, a means 21 for setting a basic threshold value TH based on the first integrated value, a means 12 for operating a second integrated value Km2 by integrating only those knock signals having amplitudes larger than a lower-limit level among the knock signals, and a means 32 for setting the basic threshold value as the lower-limit level, wherein the occurrence of knocking is judged based on the second integrated value.

7 Claims, 5 Drawing Sheets

DEVICE FOR DETECTING THE KNOCKING OF AN INTERNAL COMBUSTION ENGINE

BACKGROUND OF THE INVENTION

1. Field of the Invention

The present invention relates to a device for detecting the knocking of an internal combustion engine by judging the knocking occurring in an internal combustion engine relying upon a change in the level of an ionic current flowing through an ignition plug during the combustion in an internal combustion engine. More particularly, the invention relates to a device for detecting the knocking of an internal combustion engine, which, in judging an integrated value of knock signals, excludes noise components of small amplitudes that are lasting long, in order to improve an S/N ratio of the integrated value and to reliably prevent such an occurrence that noise is detected as knocking.

2. Prior Art

In an internal combustion engine as is well known, a mixture of the air and the fuel introduced into a combustion chamber is compressed by the rise of a piston, an electric spark is generated by applying a high voltage to a spark plug installed in the combustion chamber to burn the mixture, and the force produced as the piston is pushed down is recovered as an output.

When the combustion takes place in the combustion chamber, molecules in the combustion chamber are ionized. When a high voltage is applied to the spark plug (electrode for detecting ionic current) installed in the combustion chamber, a current (ionic current) flows due to ions having electric charge.

The ionic current sensitively changes depending on a change in the pressure in the combustion chamber. It has therefore been known that the ionic current includes a vibration component corresponding to the amount of knocking.

It is therefore allowed to judge the occurrence of knocking relying on the ionic current.

There have heretofore been proposed a variety of devices for detecting the knocking of an internal combustion engine by judging the occurrence of knocking relying on a change in the amount of ions produced by the combustion in the internal combustion engine. For example, there has been proposed a device for judging the knocking relying on a peak-holding value of knock signals picked up from the ionic current.

When the peak-holding value is used for judgment, however, the S/N ratio drops being affected by a stepwise change in the ionic current resulting in an erroneous judgement. In order to suppress the effect caused by an instantaneous change in the ionic current, therefore, there has been proposed a device that judges the knocking relying on an integrated value of knock signals.

FIG. 4 is a block diagram schematically illustrating major portions of a conventional device for detecting the knocking of an internal combustion engine disclosed in, for example, Japanese Unexamined Patent Publication (Kokai) No. 159129/1994, and shows only a circuit for operating an integrated signal Km for judging the knocking.

In FIG. 4, an ionic current detecting circuit 1 related to an ignition device (not shown) includes a bias current source for feeding an ionic current through an ignition device, and amplifies and detects the ionic current, and outputs an ionic current detection signal Ei.

The ionic current detection circuit 1 may be constituted in any manner provided it finally outputs knock signals Ki in the knocking frequency band.

As is well known, the bias current source is connected to the spark plug though not diagramed here.

A band-pass filter 2 has predetermined frequency characteristics corresponding to knocking vibration, and picks up knock signals Ki in an amplified manner from the ionic current detection signals Ei.

An absolute value circuit 3 produces the knock signal Ki picked from the ionic current detection signal Ei as an absolute value.

An integrating circuit 4 integrates the knock signal Ki in the form of an absolute value to produce an integrated signal Km.

The integrated signal Km is input to a comparator means 5 (knock-judging means), compared with the background level (knock-judging level), and is used for judging the occurrence of knocking.

FIG. 5 is a diagram of waveforms illustrating the operation of the conventional device for detecting the knocking of an internal combustion engine.

In FIG. 5, an ignition signal P is applied to an ignition device for every ignition cycle of the internal combustion engine, turns the power transistor (not shown) on and off as is well known, and interrupts the flow of current into the primary winding (not shown) of the ignition coil.

The ionic current detection signal Ei is formed immediately after the ignition signal P is turned on and during the combustion period after the ignition signal P is turned off.

The knock signals Ki are formed by picking up the high-frequency vibration components only superposed on the ionic current detection signal Ei.

The integrated signal Km holds the peak by integrating the absolute value components of the knock signals Ki, and is reset after every data-fetching timing t1, t2.

In, for example, the integrated signal Km, the waveform Kma at the time when the knocking has occurred is reaching a level larger than the background level BG. When the noise vibration Kn has occurred having a small amplitude and lasting long, the waveform Kmb of the integrated signal has a level lower than that of the waveform Kma of when the knocking has occurred but is still relatively high.

In FIG. 5, even during the normal combustion in which no knocking is occurring, the noise vibration of a small amplitude is superposed on the ionic current detection signal Ei, and the noise vibration Kn of a low level may often be detected as a knock signal Ki.

Further, due to a stepwise change in the ionic current detection signal Ei, a peak waveform of the same level as that of when the knocking has occurred is often superposed on the knock signal Ki.

The stepwise current that changes within very short periods of time little affects the integrated value, and is smaller than the integrated value of when the knocking has occurred, making it possible to maintain a correct knocking detection.

However, when the noise vibration Kn has occurred having a small amplitude and lasting long, no large difference is produced between the waveform levels Kma and Kmb of the integrated signals corresponding to the presence and absence of knocking, and it becomes difficult to detect the knocking.

In particular, noise vibration Kn of a frequency near the knock frequency band is often superposed on the ionic current detection signal Ei due to a change in the power source voltage or ground potential, being affected by electromagnetic waves or due to a change in the ionic current itself.

In such a case, the integrated signal Km rises due to noise components of small amplitudes lasting long, making it very difficult to maintain an S/N ratio for favorably judging the knocking.

In the conventional device for detecting the knocking of an internal combustion engine, when the noise vibration Kn of frequency near the knock frequency band having a small amplitude and lasting long is superposed on the ionic current detection signal Ei, the integrated signal Km rises above the background level BG, and noise may be erroneously judged as the knocking.

SUMMARY OF THE INVENTION

The present invention was accomplished in order to solve the above-mentioned problems, and its object is to provide a device for detecting the knocking of an internal combustion engine which maintains a favorable knock-detecting state by preventing such an occurrence that noise is judged as the knocking even when the noise component having a small amplitude and lasting long is superposed on the ionic current detection signal.

A device for detecting the knocking of an internal combustion engine according to the present invention comprises:

an ionic current detecting means for detecting the ionic current that flows through a spark plug during the combustion in an internal combustion engine;

a filter means for picking up knock signals from said ionic current; and a knock judging means for judging the knocking state of said internal combustion engine based on said knock signals; and further comprising:

a first integrating means for operating a first integrated value by integrating said knock signals;

a threshold value-setting means for setting a basic threshold value based on said first integrated value;

a second integrating means for operating a second integrated value by integrating only those knock signals having amplitudes larger than a lower-limit level among said knock signals; and a lower-limit level-setting means for setting said basic threshold value as said lower-limit level;

wherein said knock judging means judges the occurrence of knocking based on said second integrated value.

In the device for detecting the knocking of an internal combustion engine according to the present invention, said threshold value-setting means sets said basic threshold value based on a value obtained by averaging the first integrated value for each ignition cycle of said internal combustion engine.

In the device for detecting the knocking of an internal combustion engine according to the present invention, when it is judged that the knocking has occurred in an ignition cycle, said knock judging means inhibits the averaging processing executed by said threshold value-setting means.

In the device for detecting the knocking of an internal combustion engine according to the present invention, when it is judged that the knocking has occurred in an ignition cycle, said knock judging means holds said basic threshold value at the value of the previous time.

In the device for detecting the knocking of an internal combustion engine according to the present invention, when it is judged that the knocking has occurred in an ignition cycle, said knock judging means inhibits the integration processing executed by said first integrating circuit.

In the device for detecting the knocking of an internal combustion engine according to the present invention, provision is made of an upper-limit level-setting means for setting the upper-limit level for said first integration means, wherein said threshold value-setting means sets a background level based on said basic threshold value, said upper-limit level-setting means sets said background level as an upper-limit level, and said first integrating means operates said first integrated value by integrating only those knock signals having amplitudes smaller than said upper-limit level among said knock signals.

In the device for detecting the knocking of an internal combustion engine according to the present invention, the threshold value-setting means sets an offset value based on the basic threshold value, and said offset value is added to said basic threshold value to set said background level.

DESCRIPTION OF THE PREFERRED EMBODIMENTS

An embodiment 1 of the invention will now be described with reference to the drawings.

Figure 1:
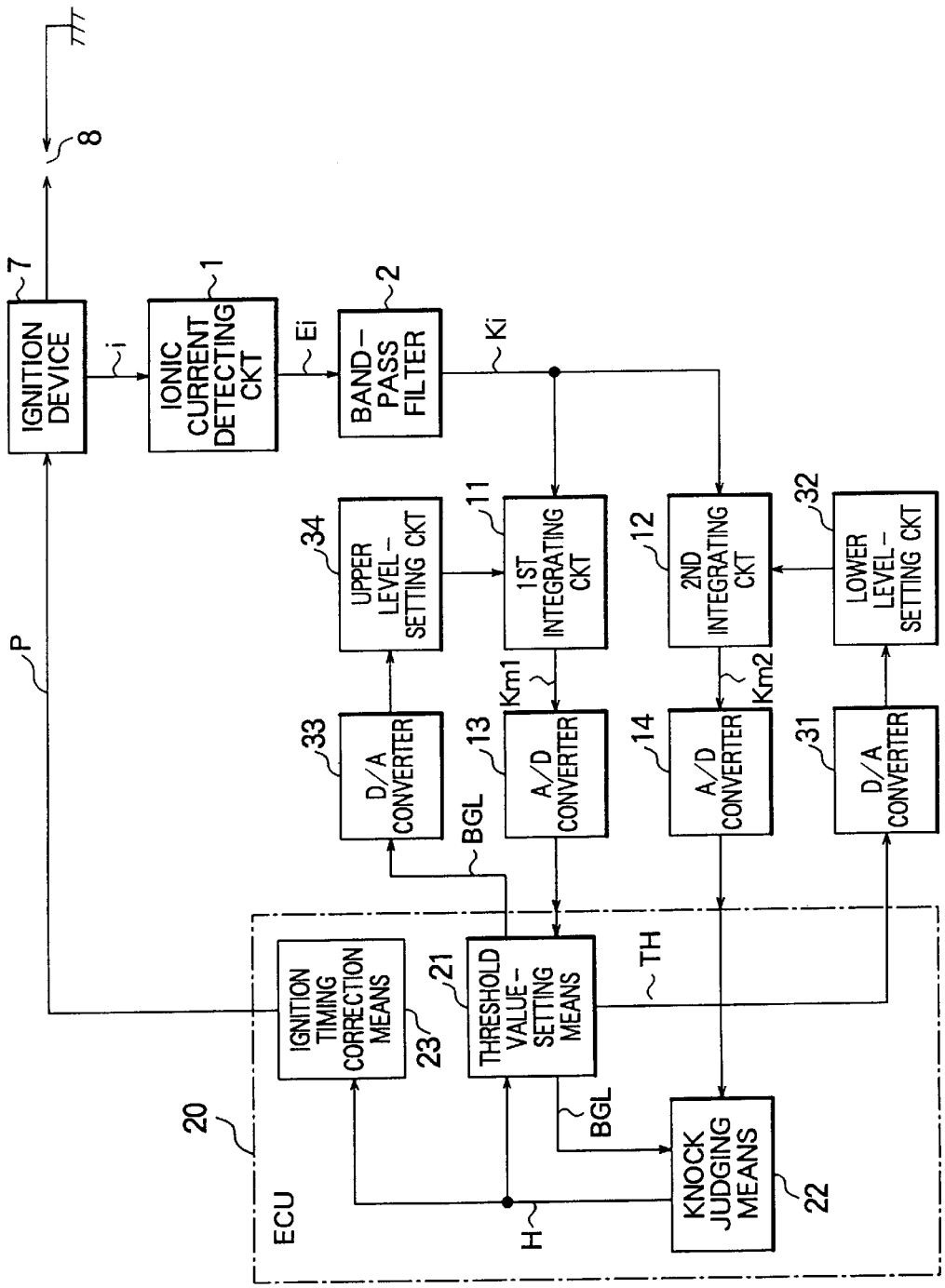
FIG. 1 is a block diagram schematically illustrating an embodiment 1 according to the present invention.
Figure 4:
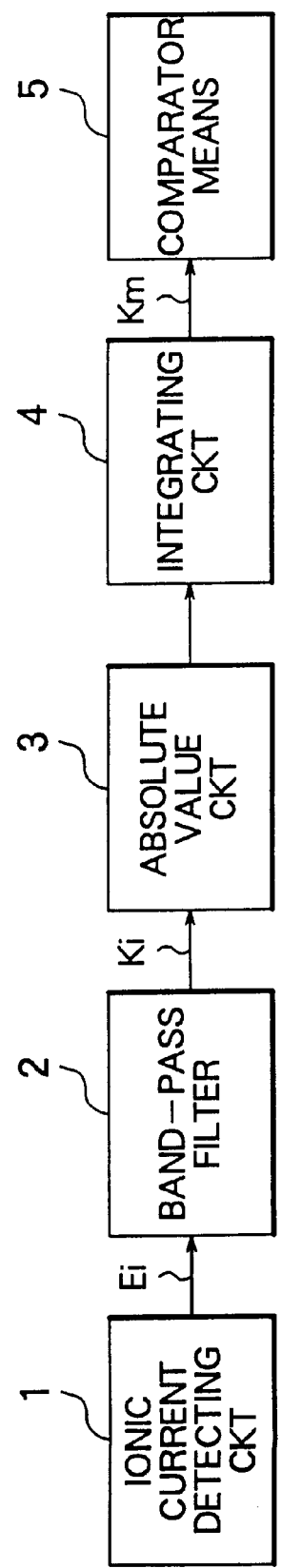
FIG. 4 is a block diagram schematically illustrating major portions of a conventional device for detecting the knocking of an internal combustion engine.

FIG. 1 is a block diagram schematically illustrating an embodiment 1 of the present invention, wherein the same portions as those described above (see FIG. 4) are denoted by the same reference numerals but are not described in detail.

In FIG. 1, an ignition device 7 connected to a spark plug 8 includes a power transistor and an ignition coil (not shown), and applies a high ignition voltage to the spark plug 8. Here, only one spark plug 8 is shown representatively.

The ionic current detecting circuit 1 includes the above-mentioned bias power source, detects the ionic current i that flows through the spark plug 8 during the combustion in the internal combustion engine, and sends an ionic current detection signal Ei to a band-pass filter 2.

A knock signal Ki picked up through the band-pass filter 2 is input to first and second integrating circuits 11 and 12.

The first integrating means 11 operates a first integrated value Km1 by integrating knock signals Ki having amplitudes smaller than an upper-limit level (described later).

The second integrating means 12 operates a second integrated value Km2 by integrating knock signals Ki having amplitudes larger than a lower-limit level (described later).

The first and second integrated values Km1 and Km2 are converted into digital values through the A/D converters 13 and 14, and are input to an ECU 20 comprising a microcomputer.

The ECU 20 includes a threshold value-setting means 21, a knock judging means and an ignition timing correction means for judging the knocking state of the internal combustion engine based on the knock signal Ki.

The threshold value-setting means 21 sets a basic threshold value TH and a background level BGL based on the first integrated value Km1.

The threshold value-setting means 21 includes an averaging means and sets the basic threshold value TH based on a value obtained by averaging the first integrated value Km1 for every ignition cycle of the internal combustion engine.

In the threshold value-setting means 21, the averaging processing may be effected based on any equation provided a basic threshold value TH (average value) can be calculated.

Further, the threshold value-setting means 21 sets an offset value based on the basic threshold value TH, and adds the offset value to the basic threshold value TH to set a background level BGL.

The knock judging means 22 includes a comparator means, judges that the knocking has occurred when the second integrated value Km2 exceeds the background level BGL, and sends a judgement signal H to the ignition timing correction means 23.

When it is judged that the knocking has occurred in an ignition cycle, the knock judging means 22 produces the judgement signal H as an inhibition instruction to inhibit the operation (averaging) of the basic threshold value TH in the threshold value-setting means 21.

The ignition timing correction means 23 corrects the ignition timing (engine control quantity) toward the delay side (knock-suppressing side) based on the judged result (judgement signal H) of the knock judging means 22.

The basic threshold value TH formed by the threshold value-setting means 21 is converted into an analog value through the D/A converter 31, and is input to a lower-limit level-setting means 32.

The lower-limit level-setting means 32 sets the basic threshold value TH as a lower-limit level for the second integrated circuit 12, and limits the knock signals Ki that are to be integrated by the second integrating circuit 12 to only those knock signals larger than the basic threshold value TH (lower-limit level).

On the other hand, the background level BG formed by the threshold value-setting means 21 is converted into an analog value through the D/A converter 33, and is input to an upper-limit level-setting means 34.

The upper-limit level-setting means 34 sets the background level BGL as the upper-limit level for the first integrating circuit 11, and limits the knock signals Ki that are to be integrated by the first integrating circuit 11 to only those knock signals smaller than the background level BGL (upper-limit level).

Though not diagramed, various sensors inclusive of a crank angle sensor and the like are connected to the ECU 20, and various data representing the operation conditions of the engine are input to the ECU 20. Further, an output interface is inserted between the ECU 20 and the ignition device 7.

Next, described below is the operation of the embodiment 1 of the present invention shown in FIG. 1.

When an ignition signal P is formed by the ECU 20 as described above, a high voltage formed by the ignition device 7 is applied to the spark plug 8, and an electric discharge takes place across the gap of the spark plug 8 to ignite the mixture in a cylinder of the engine.

Here, the energy of ignition is partly charged as a bias voltage in the ionic current detecting circuit 1. The bias voltage is applied to the spark plug 8 through the ignition device 7, whereby ions generated by the combustion of the mixture migrates and an ionic current i flows.

The ionic current i is detected by the ionic current detecting circuit 1 as an ionic current detection signal Ei.

Further, the knock signals Ki are picked up through the band-pass filter 2 and are input to the first and second integrating circuits 11 and 12.

The first and second integrating circuits 11 and 12, respectively, integrate the absolute values (or voltages of the positive side only) of the knock signals Ki for every ignition cycle of the engine to operate the first and second integrated values Km1 and Km2.

The A/D converters 13 and 14 convert the integrated values Km1 and Km2 into digital values through the A/D conversion, and input them to the ECU 20.

The threshold value-setting means 21 in the ECU 20 averages the first integrated value Km1 for every ignition cycle to find a basic threshold value TH.

The threshold value-setting means 21 adds the offset value operated from the basic threshold value TH to the basic threshold value TH to operate a background level BGL for judging the knocking.

The knock judging means 22 in the ECU 20 compares the second integrated value Km2 read for each ignition cycle with the background level BGL and, when it is so judged that Km2>BGL, judges that the knocking has occurred and outputs a judgement signal H.

On the other hand, the basic threshold value TH and the background level BGL are converted into analog values through the D/A converters 31 and 33, and are input to the lower-limit level-setting circuit 32 and to the upper-limit level-setting circuit 34.

The lower-limit level-setting circuit 32 limits the signals to be integrated by the second integrating circuit 12 based on the basic threshold voltage TH, so that only those signals having amplitudes larger than the basic threshold value TH (lower-limit level) are integrated among the knock signals Ki.

The upper-limit level-setting circuit 34 limits the signals to be integrated by the first integrating circuit 11 based on the background level BGL, so that only those signals having amplitudes smaller than the background level BGL (upper-limit level) are integrated among the knock signals Ki.

Next, the operation of the embodiment 1 of the present invention will be described more concretely with reference to the diagrams of waveforms of FIGS. 2 and 3.

Figure 2:
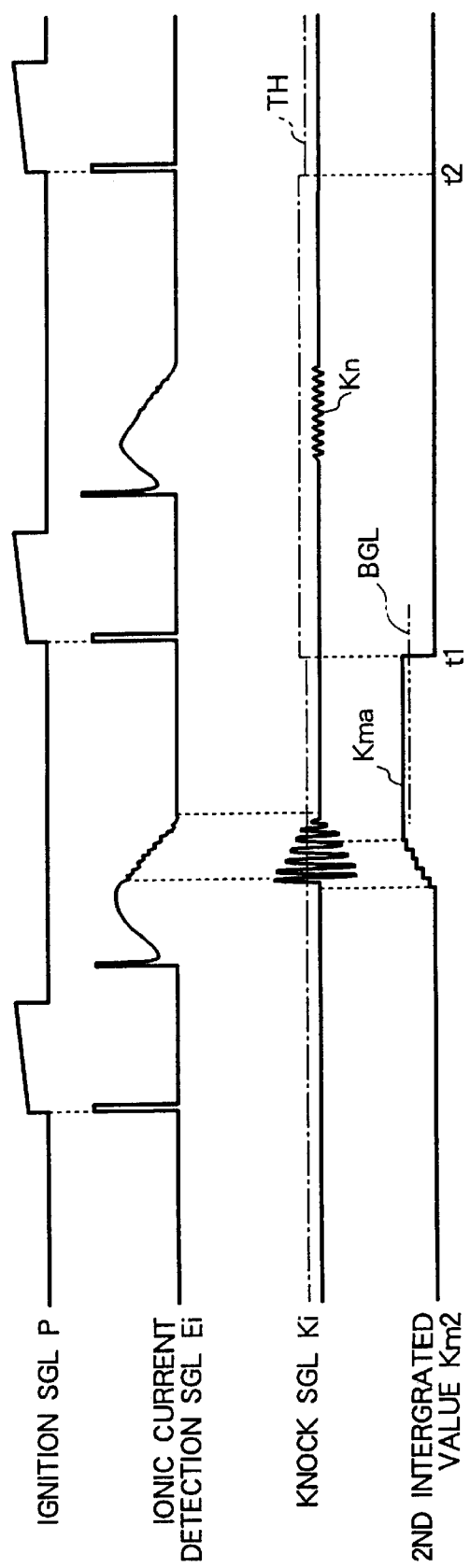
FIG. 2 is a diagram of waveforms illustrating the operation of the embodiment 1 according to the present invention.
Figure 3:
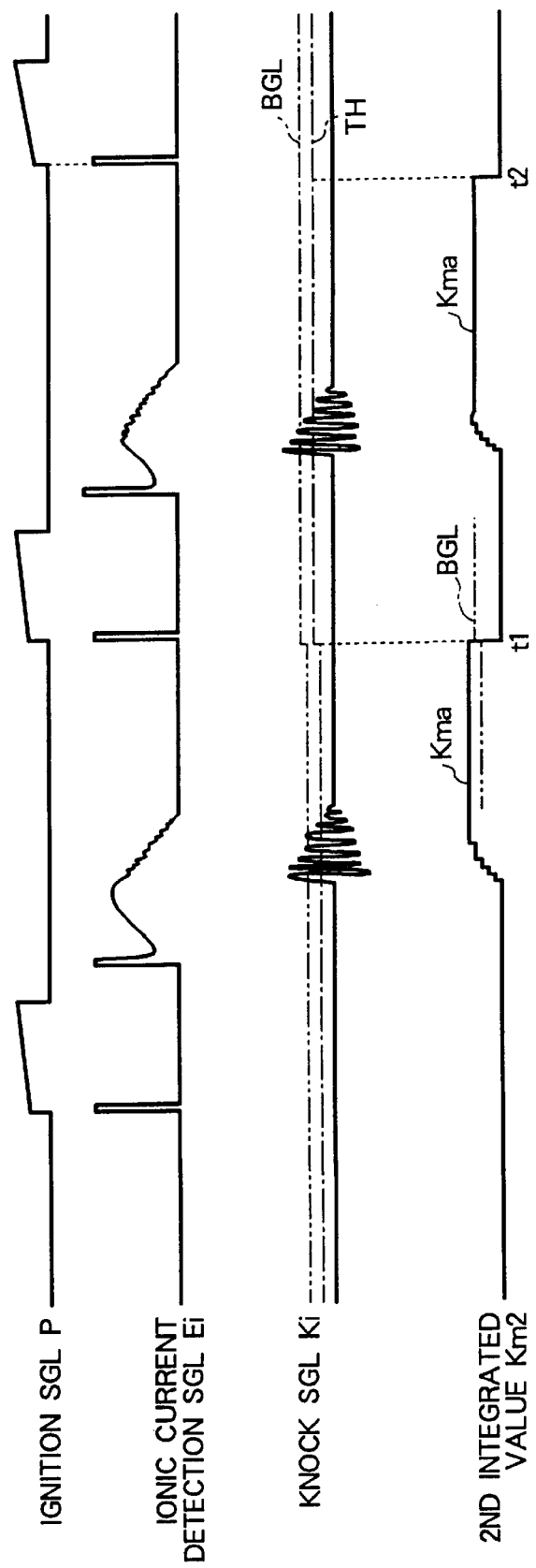
FIG. 3 is a diagram of waveforms illustrating the operation of the embodiment 1 according to the present invention.
Figure 5:
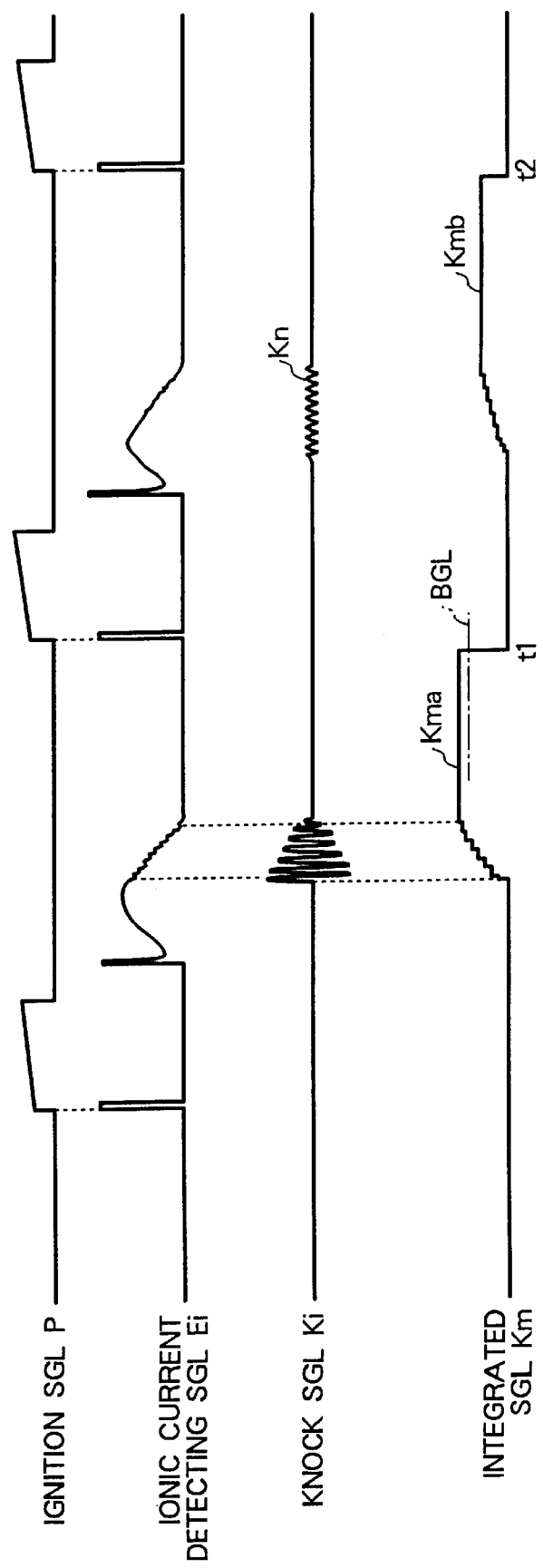
FIG. 5 is a diagram of waveforms illustrating the operation of the conventional device for detecting the knocking of an internal combustion engine.

FIGS. 2 and 3 illustrate changes in the ignition signal P, ionic current detection signal Ei, knock signal Ki and second integrated value Km with the passage of time like those described above (see FIG. 5).

In FIGS. 2 and 3, symbols t1 and t2 denote a timing for A/D conversion (data fetching) of the second integrated value Km2 and a timing for resetting the second integrated value Km2.

The second integrated value Km2 in FIG. 2 represents a waveform Kma of when the knocking has occurred and a waveform (level 0) of when the noise vibration Kn (without knocking) having a small amplitude and lasting long is superposed on the ionic current detection signal Ei.

In FIG. 2, the knock signals Ki to be integrated by the second integrating circuit 12 are only those signals larger than the basic threshold value TH. Therefore, the noise vibration Kn of a level smaller than the basic threshold value TH is not integrated despite it lasts long.

Therefore, the value Kma of when the knocking has occurred in the second integrated value Km2 is larger than the value (nearly 0) of when no knocking has occurred, producing an increased S/N ratio. Upon comparing the second integrated value Km2 with the background level BGL, therefore, the knocking can be reliably judged.

FIG. 3 illustrates the case where the knock signals Ki of a high level are consecutively generated, and the second integrated value Km2 is consecutively reaching the waveform level Kma of when the knocking has occurred.

In this case, when the first integrating circuit 11 operates the first integrating value Km1 by integrating the knock signals Ki inclusive of those of high levels, the basic threshold value TH found by averaging the first integrated value Km1 abnormally rises.

As a result, the knock signals larger than the basic threshold value TH for operating the second integrated value Km2 are excessively suppressed among the knock signals Ki, and the second integrated value Km2 abnormally decreases.

In this case, however, the signals to be integrated by the first integrating circuit 11 are limited to those smaller than the background level BGL. Among the knock signals Ki, therefore, those signals larger than the background level BGL are not used by the threshold value-setting means 21 for operating (averaging) the basic threshold value TH.

Therefore, even when the knock signals Ki of the knocking level are consecutively generated as shown in FIG. 3, the basic threshold value TH does not abnormally rise. Therefore, the second integrated value Km2 (value reflecting the intensity of knocking) is prevented from decreasing, and the knock judging means 22 reliably judges the occurrence of knocking based on the second integrated value Km2 of the knocking level Kma (>BGL).

When the knocking is judged based on the second integrated value Km2 of the first time, the averaging processing by the threshold value-setting means 21 is inhibited by the judgement signal H, and the basic threshold value TH is further suppressed from abnormally rising.

As described above, the second integrated value Km2 is operated by setting the basic threshold value TH, the noise component of a small amplitude lasting long is not integrated in judging the knocking, and the noise component is permitted to infiltrate in a minimum amount into the second integrated value Km2, making it possible to increase the S/N ratio of the second integrated value Km2 for detecting the knocking and, hence, to improve reliability for judging the knocking.

At the time when the knocking is generated, further, the basic threshold value TH is suppressed from abnormally rising (or the averaging processing is inhibited) in order to decrease the degree of rise of the basic threshold value TH and to prevent the second integrated value Km2 from abnormally decreasing, making it possible to maintain a state where the knocking can be reliably judged.

Further, the second integrated value Km2 obtained by integrating the knock signals Ki helps maintain a high S/N ratio even when the noise vibration caused by a stepwise change in the ionic current has infiltrated and, hence, helps maintain reliable judgement of the knocking.

Further, the integrating circuits 11 and 12 may convert half waves of the knock signals Ki of the positive side into integrated voltages, or may be provided with an absolute value circuit to integrate whole waves of the voltages of both the positive and negative sides.

Further, the integrating circuits 11 and 12 may integrate the knock signals over a section of, for example, an engine crank angular range of from ATDC 15° to ATDC 65° where the knocking is highly likely to occur.

FIG. 1 illustrates the circuit constitution for one cylinder only for the purpose of simplicity. For a multi-cylinder engine, however, the parameters may be corrected for all cylinders based on the data of the cylinders by using a similar control circuit means including a correction amount operation means 25.

In the foregoing embodiment, further, the knock judging means 22 outputs the judgement signal H only. However, the knock judging means 22 may produce not only the judgement signal H but also a difference (or ratio) between the background level BGL (knock-judging level) and the second integrated value Km2 to reflect it on the control correction amount.

The background level BGL operated from the first integrated value Km1 was used as a knock-judging level. It is, however, also allowable to use an average value of the second integrated value Km2 obtained for each ignition cycle as the knock-judging level.

Embodiment 2.

In the above-mentioned embodiment 1, the averaging processing by the threshold value-setting means 21 was inhibited when the knock judging means 22 has judged that the knocking is occurring in an ignition cycle. However, the basic threshold value TH may be held at the value of the previous time.

Embodiment 3.

When the knock judging means 22 has judged that the knocking is occurring, the integration processing by the first integrating circuit 11 may be inhibited in response to the judgement signal H.

Embodiment 4.

In the above-mentioned embodiment 1, the basic threshold value TH was set based on the averaging processing by the threshold value-setting means 21 in the ECU 20. However, the basic threshold value TH may be set based on the averaging processing by using an analog circuit arranged outside the ECU 20.

The background level BGL was set by the threshold value-setting means 21 in the ECU 20. It is, however, also allowable to set the background level BGL by using the basic threshold value TH operated by the analog circuit arranged outside the ECU 20.

What is claimed is:

1. A device for detecting the knocking of an internal combustion engine, comprising:
   an ionic current detecting means for detecting the ionic current that flows through a spark plug during the combustion in an internal combustion engine;
   a filter means for picking up knock signals from said ionic current; and
   a knock judging means for judging the knocking state of said internal combustion engine based on said knock signals;
   said device for detecting the knocking of an internal combustion engine further comprising:
   a first integrating means for operating a first integrated value by integrating said knock signals;
   a threshold value-setting means for setting a basic threshold value based on said first integrated value;
   a second integrating means for operating a second integrated value by integrating only those knock signals having amplitudes larger than a lower-limit level among said knock signals; and
   a lower-limit level-setting means for setting said basic threshold value as said lower-limit level;
   wherein said knock judging means judges the occurrence of knocking based on said second integrated value.

2. A device for detecting the knocking of an internal combustion engine according to claim 1, wherein said threshold value-setting means sets said basic threshold value based on a value obtained by averaging the first integrated value for each ignition cycle of said internal combustion engine.

3. A device for detecting the knocking of an internal combustion engine according to claim 2, wherein when it is judged that the knocking has occurred in an ignition cycle, said knock judging means inhibits the averaging processing executed by said threshold value-setting means.

4. A device for detecting the knocking of an internal combustion engine according to claim 2, wherein when it is judged that the knocking has occurred in an ignition cycle, said knock judging means holds said basic threshold value at the value of the previous time.

5. A device for detecting the knocking of an internal combustion engine according to claim 1, wherein when it is judged that the knocking has occurred in an ignition cycle, said knock judging means inhibits the integration processing executed by said first integrating means.

6. A device for detecting the knocking of an internal combustion engine according to claim 1, further comprising:

an upper-limit level-setting means for setting the upper-limit level for said first integration means; wherein said threshold value-setting means sets a background level based on said basic threshold value;

said upper-limit level-setting means sets said background level as an upper-limit level; and said first integrating means operates said first integrated value by integrating only those knock signals having amplitudes smaller than said upper-limit level among said knock signals.

7. A device for detecting the knocking of an internal combustion engine according to claim 6, wherein said threshold value-setting means sets an offset value based on the basic threshold value, and said offset value is added to said basic threshold value to set said background level.

* * * * *